United States Patent [19]

Krafft et al.

[11] 4,104,067

[45] Aug. 1, 1978

[54] POLYMER BINDER

[75] Inventors: Werner Krafft, Leverkusen; Günther Arnold, Ulm; Gabor Paal, Stuttgart; Hans-Peter Vollmer, Ulm, all of Fed. Rep. of Germany

[73] Assignee: AGFA-Gevaert, AG, Leverkusen, Fed. Rep. of Germany

[21] Appl. No.: 543,273

[22] Filed: Jan. 23, 1975

[30] Foreign Application Priority Data

Jan. 29, 1974 [DE] Fed. Rep. of Germany ....... 2404042

[51] Int. Cl.$^2$ ......................... G03G 5/04; B32B 27/36

[52] U.S. Cl. .................................. 96/1.5 R; 428/483; 428/913; 428/500; 428/514; 428/522; 428/355; 526/328

[58] Field of Search ............... 428/500, 514, 522, 483, 428/913; 260/86.1 E

[56] References Cited

U.S. PATENT DOCUMENTS

| | | | |
|---|---|---|---|
| 3,513,021 | 5/1970 | Sweeney et al. | 428/514 X |
| 3,637,414 | 1/1972 | Newman et al. | 428/913 X |
| 3,811,913 | 5/1974 | Kasugai et al. | 428/474 |
| 3,836,514 | 9/1974 | Fechillas | 260/86.1 E |
| 3,924,041 | 12/1975 | Miyayama | 428/913 X |

*Primary Examiner*—P. C. Ives

*Attorney, Agent, or Firm*—Connolly and Hutz

[57] ABSTRACT

Copolymers of methylacrylate/alkyl acrylate or methyl methacrylate/alkyl methacrylate are used as a binder for UV-sensitive recording materials, preferably recording materials which contain substances which are capable of discoloration.

5 Claims, No Drawings

POLYMER BINDER

This invention relates to a polymer binder for a recording material which is sensitive to UV-light.

The main object of such binders is to keep the other constituents in the recording material, such as the substances which are capable of discolouration, the HX-donors and sensitisers, if any, in a definite position relative to each other Substances which have been found to be suitable for this purpose are polymers or copolymers which, in addition, have good optical properties such as transparency in the visible and infrared region. Most of these binders, however, have a high absorption in the UV-range so that the sensitivity of the recording material is seriously impaired by radiation damping.

If the recording material is to be used e.g. as a data record, in which the data are inscribed by means of UV radiation, the choice of binders is therefore restricted to only a few substances. These include, for example, polystyrene and polymethacrylate although these compounds are no more than merely satisfactory in their absorption properties in the UV-range. Much more serious is the difficulty that the film layers which contain these substances are so brittle that, if the films are bent only a few times, they acquire so many hair line cracks that they become opaque and therefore unusable.

It is therefore an object of this invention to provide a binder in which the absorption for UV radiation used for recording is as low as possible and which has sufficient mechanical strength to resist mechanical strain, particularly of the kind as it may occur in a material when applied in an optical data memory. According to the invention, this problem is reduced or subtantially solved by the fact that the binder is a copolymer of methyl methacrylate/alkyl acrylate or methyl methacrylate/alkyl methacrylate. It is preferred to use those alkyl acrylates or alkyl methacrylates as comonomers in which the alkyl groups contain at least two and preferably two to six carbon atoms. These compounds will hereinafter be referred to as "higher alkyl acrylate" or "higher alkyl methacrylate".

The advantageous properties of this material result from the use of higher alkyl acrylates or alkyl methacrylates as comonomers because they increase the suppleness of films produced from them. On the other hand, the proportion of higher alkyl acrylates or alkyl methacrylates in the copolymers must not be too high because, with increasing softness, the permeability of the copolymers to other substances of which the recording material is composed also increases depending upon their vapour pressure. The result is that the photoactive constituents of the layer are no longer firmly held in the layer but diffuse off and the stability of the layers in storage is correspondingly reduced.

It is found that particularly good results are obtained with a proportion of methyl methacrylate to higher alkyl acrylate or alkyl methacrylate of between 1 : 2 and 10 : 1,preferably between 2 : 1 and 6 : 1. The following comonomers have been found to be satisfactory: alkyl acrylates and alkyl methacrylate in which the alkyl groups contain at least two carbon atoms, in particular ethyl, propyl, butyl, amyl and hexyl acrylate and butyl, amyl and hexyl methacrylate. Exceptionally good results have been obtained when butyl acrylate and hexyl acrylate were used as comonomers.

The copolymers mentioned above are preferably used as binders in a UV-sensitive recording material which contains at least one substance which is capable of discolouration, one HX-donor and, optionally, a sensitiser. The following are examples of suitable substances which are capable of discolouration: spirodibenzopyran, spirobenzonaphthopyran, spirodinaphthopyran, spirotrimethyl indolinobenzopyran, spirotrimethyl indolinonaphthopyran, spiro-oxazine, aryl vinyl pyran and aryl vinyl thiopyran.

If the discolouration produced is required to be irreversible, it is necessary to add an HX-donor, preferably in the form of an organic halogen compound. The following are examples of such compounds: carbon tetrabromide, bromotriphenylmethane, pentachlorophenol, pentabromophenol, trichloroacetaldehyde monoethyl acetal, 1,1,1-trichloro-2-(2,2,2-trichloro-1-hydroxyethoxy)-2-methyl-propane, 1,2-dichloroacetone, tetrabromobutanol, tetrabromophenylpropane and tribromoethanol.

Suitable sensitisers are e.g. diphenylamine and benzophenone.

The recording material is usually prepared in the form of a layer applied to a mechanically firm substrate, in most cases a substrate consisting of a polymer film, although if the layers have sufficient mechanical strength on their own they may also be used as self-supporting layers.

The advantageous properties of the binder according to the invention can be illustrated by two examples (film A and film B) which are prepared from the following composition:

Film A 3.33 . $10^{-2}$ mol per liter of 2-n-amyl-7'-methoxyspiro[3H-naphtho(2,1-b)pyran-3,2'-2H-benzo(1) pyran] and 1 mol per liter of $\alpha,\alpha,\alpha$-tribromoethanol in polymethyl methacrylate on a 180 $\mu$ polyester film Film B 3.33 . $10^{-2}$ mol per liter of 2-n-amyl-7'-methoxyspiro[3H-naphtho(2,1-b)pyran-3,2'-2H-benzo(1) pyran] and 1 mol per liter of $\alpha,\alpha,\alpha$-tribromoethanol in polymethyl methacrylate/butyl acrylate (3 : 1) on a 180 $\mu$ polyester film.

The composition of film A is characteristic of known recording materials of this kind while film B may serve as an example of the recording material according to the invention. Both films were tested in an apparatus composed of four rolls with different radii of curvature so that the layer was both stretched (radius of curvature 15.0 mm) and compressed (radius of curvature 24.0 mm). Film A was completely covered with hair cracks after 1000 tests while film B was still free from hair cracks after 100,000 tests.

We claim:

1. An improved recording material sensitive to UV-radiation comprising a film substrate and a binder layer adhered to a surface of said substrate containing at least one substance which is capable of discoloration on response to UV-radiation.

wherein the improvement comprises a binder layer transparent to UV-radiation consisting essentially of a copolymer of 33%–91% by weight of methyl methacrylate and 67%–9% by weight of alkyl acrylate or alkyl methacrylate, the alkyl group of the alkyl acrylate or alkyl methacrylate containing from 2 to 6 carbon atoms, said binder layer on said substrate being flexible as a recording material and free from hair cracks after over 1000 flexures over curved surfaces of radii ranging from 15–24 mm.

2. A supported or self-supporting binder layer of a material for containing a substance sensitive to UV-radiation capable of discoloration on response to UV-radiation, said material being transparent to UV-radiation and consisting essentially of a copolymer of 33%–91% of methyl methacrylate with 67%–9% of alkyl acrylate or a copolymer of 33%–91% methyl methacrylate with 67%–9% of alkyl methacrylate wherein the alkyl group of the alkyl acrylate or alkyl methacrylate contains at least two carbon atoms.

3. An improved binder material as claimed in claim 2 wherein the binder consists of a copolymer of methyl methacrylate/butyl acrylate.

4. An improved binder material as claimed in claim 2 wherein the copolymer is of 67% to 85.5% methyl methacrylate and 33% to 14.5% alkylacrylate of alkylmethacrylate.

5. An improved binder material as claimed in claim 2 wherein the layer contains a binder which contains at least one HX-donor wherein H stands for hydrogen and X stands for halogen.

* * * * *